Patented June 3, 1930

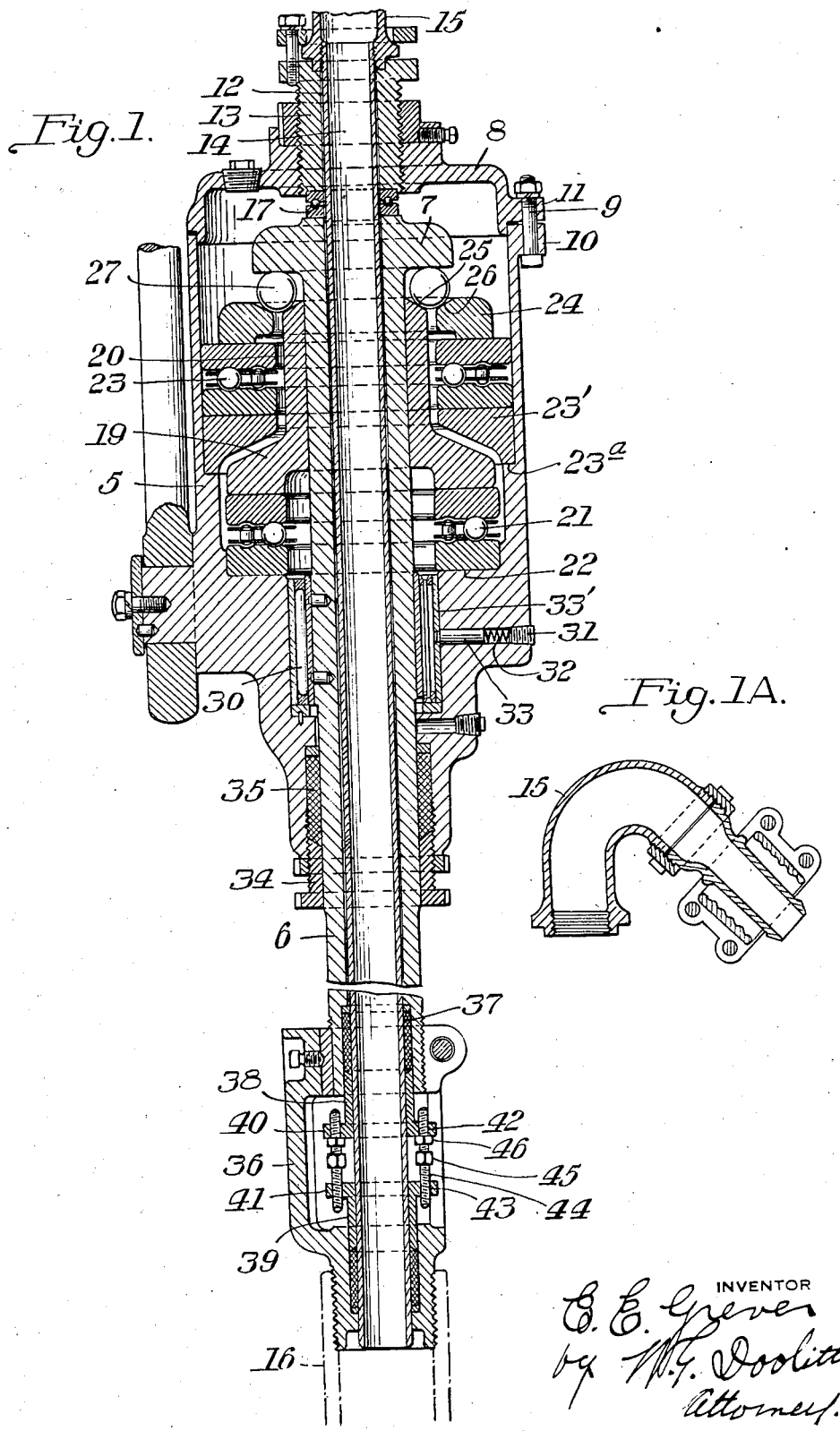

1,761,826

UNITED STATES PATENT OFFICE

EDGAR E. GREVE, OF BELLEVUE, PENNSYLVANIA, ASSIGNOR TO OIL WELL SUPPLY COMPANY, OF PITTSBURGH, PENNSYLVANIA, A CORPORATION OF PENNSYLVANIA

SWIVEL FOR ROTARY DRILLING APPARATUS

Application filed April 6, 1927. Serial No. 181,594.

My invention relates to swivels, and more particularly to hydraulic swivels designed for use in connection with rotary drill apparatus employed for drilling oil and gas wells.

Owing to the great depth it is now necessary to drill some oil and gas wells, the loads on the swivels employed are very great, and it becomes of the greatest importance to provide a swivel construction that will carry these heavy loads to which the swivels are subjected.

The prime object of the present invention is to provide a strong, durable and efficient swivel that will successfully take care of the loads placed on the swivels.

Another object of the present invention is to provide a construction in which the loads are carried on a plurality of bearings, provision being made for distributing and equalizing the loads on the several bearings of the swivel structure.

In the accompanying drawing, which illustrates an application of my invention:

Fig. 1 is a vertical section of my improved swivel, one-half being taken on a plane at right angles to the other half; and Fig. 1—A is a sectional view showing the goose-neck of the swivel device.

Referring to the drawings, the swivel structure, as illustrated, includes a hollow body member 5, a swivel stem 6 having a head 7 formed integral therewith, a cap or top closure member 8 secured to the upper end of the body by bolts 9 passed through flanged portions 10 and 11 respectively formed on the body and cap members. Cap member 8 is formed with a central opening 12 designed to receive a hollow adjusting plug 13, which latter surrounds a pipe 14 designed to pass mud and water employed in the drilling operation down through the swivel and into the drill pipes. Pipe 14 extends through the body 5 and is connected at its upper end to a goose-neck 15, and its lower end is in communication with a section of drill pipe 16.

Between the head 7 and the adjusting plug or bushing 13, ball bearings 17 are provided. The function of these bearings is to support the upper portion of the swivel or the body, bail, cap, etc., when the bail is disconnected from its supporting means, as when the end of the drill pipe is resting against the bottom of the well. In this position, the bearings 17 take the weight of the body, etc., and serve to prevent friction between the head and the upper part of the swivel.

Located within the body, and having a slight vertical movement on the swivel stem 6, I provide a movable head or member 19 having an elongated sleeve portion 20 that surrounds the swivel stem, said head being mounted on anti-friction bearings 21 disposed between a ledge 22 of the body and the said member 19.

23 designates ball bearings for the upper swivel head 7, these bearings being disposed between an annular block 23 supported on an annular flange 23ª of the body, and a free ring member 24. The upper portion of the slidable member 19 is tapered or beveled, as shown at 25, and member 24 is provided with a similar inclined or beveled face 26. These beveled portions are designed to contain a series of balls 27 disposed between the under face of the head 7 and the said members 19 and 24.

It will be noted that the balls 27 are designed to carry the loads to which the head 7 is subjected and that the loads are transmitted to the inclined faces of the slightly movable member 19 and the free slightly movable ring member 24, and from the said members to their respective bearings 21 and 23. As member 24 may move vertically relatively to the swivel stem, similarly to the movement of member 19, it will be understood that, should a difference in load occur on either bearing 21 or 23, the loads will at once be equalized, due to vertical movement of either member 19 or member 24, thus causing the balls 27 to be moved inwardly or outwardly slightly on the bearing or under face of the head 7.

By providing the two sets of bearings 21 and 23 acting in conjunction with the heads 19 and 7, the load on the swivel may be divided between the two sets of bearings and the load on the respective bearings may be 100 equalized by the means just above described.
Mounted between the body and the cylindrical stem, and just below the bearings 21, are vertical roller bearings 30 adapted to take the side thrust of the parts. 31 designates a screw plug threaded into a lateral passageway extending through the body 5 and bearing against a spring 32, which, in turn, bears against a retaining pin 33, which latter acts to retain the liners 33' of the bearings 30 in position.

Between the lower end of the body 5 and a portion of the stem 6, I provide a gland 34 threaded into the body, together with packing means 35 for the purpose of packing off the swivel stem from the body and thereby retaining the lubricating oil usually placed in the body.

36 designates a coupling member threaded to the lower end of the swivel stem 6, designed to connect the swivel structure with a section 16 of the drill pipe. The coupling is provided with stuffing-boxes including packing elements 37 and glands 38 and 39. Said glands 38 and 39 are each provided with flanged portions 40 and 41 respectively, said portions being formed with alined openings 42 and 43 adapted to receive right and left handed threaded adjusting bolts 44 entered in said openings. Bolts 44 are each provided with a head 45 for turning the bolt and with a lock nut 46, by means of which the respective glands may be adjusted to the desired positions.

The packing construction described eliminates threaded connections between the glands and the stuffing-boxes and permits a simultaneous movement of said glands by manipulating the head 45. The purpose of providing the packings is to prevent the mud and fluid contained in pipe 14 from working in between the outer surface of said pipe and the inner face of the swivel stem and between said pipe and the coupling.

It is, of course, understood that the swivel is constructed so that when the swivel is ready for use the loads will be equally distributed upon the two sets of load carrying bearings 21 and 23; due to variations in the wear, however, means must be provided to equalize the loads on the respective bearings. This equalization is effected automatically by the means shown and described.

What I claim is:

1. In an equalizing bearing for a revolving shaft having a fixed head, a plurality of bearings comprising upper and lower bearings, means for equalizing the load among the bearings disposed above the upper bearing and comprising a series of balls and movable load transmitting elements disposed on the respective bearings, each of said elements having an inclined face, said balls arranged in contact with the fixed head and resting upon said inclined faces and cooperating therewith.

2. In an equalizing bearing for a revolving shaft having a fixed head, a plurality of bearings comprising upper and lower bearings, means for equalizing the load among the bearings disposed above the upper bearing and comprising a series of balls and movable load transmitting elements disposed on the respective bearings, said load transmitting elements disposed on the lower bearing comprising an annular head and an upwardly projecting sleeve portion having an annular inclined face, said other load transmitting element comprising an annular member having an inclined face, and said balls disposed between and in contact with the fixed head and the inclined faces.

In testimony whereof I affix my signature.

EDGAR E. GREVE.